(12) United States Patent
Canova et al.

(10) Patent No.: US 11,649,633 B2
(45) Date of Patent: *May 16, 2023

(54) SELF-CLEANING COOL ROOF SYSTEM

(71) Applicant: U.S. SILICA COMPANY, Katy, TX (US)

(72) Inventors: Steve Canova, Macon, GA (US); Chad Cannan, Lancaster, NY (US)

(73) Assignee: U.S. Silica Company, Katy, TX (US)

( * ) Notice: Subject to any disclaimer, the term of this patent is extended or adjusted under 35 U.S.C. 154(b) by 379 days.

This patent is subject to a terminal disclaimer.

(21) Appl. No.: 16/911,687

(22) Filed: Jun. 25, 2020

(65) Prior Publication Data

US 2020/0325683 A1 Oct. 15, 2020

Related U.S. Application Data

(63) Continuation of application No. 15/697,547, filed on Sep. 7, 2017, now Pat. No. 10,704,262.

(60) Provisional application No. 62/399,850, filed on Sep. 26, 2016.

(51) Int. Cl.
| | | |
|---|---|---|
| *E04D 1/20* | (2006.01) |
| *E04D 1/00* | (2006.01) |
| *B32B 7/00* | (2019.01) |
| *B32B 27/00* | (2006.01) |
| *B32B 9/00* | (2006.01) |

(52) U.S. Cl.
CPC ............... *E04D 1/20* (2013.01); *B32B 7/00* (2013.01); *B32B 9/005* (2013.01); *B32B 27/00* (2013.01); *E04D 2001/005* (2013.01); *Y02A 30/254* (2018.01); *Y02B 80/00* (2013.01)

(58) Field of Classification Search
CPC ........................... E04D 1/20; E04D 2001/005
See application file for complete search history.

(56) References Cited

U.S. PATENT DOCUMENTS

| | | | |
|---|---|---|---|
| 2,378,817 A | 6/1945 | Wrightsman et al. | |
| 3,758,318 A | 9/1973 | Farris et al. | |
| 4,068,718 A | 1/1978 | Cooke, Jr. et al. | |
| 4,427,068 A | 1/1984 | Fitzgibbon | |
| 4,440,866 A | 4/1984 | Lunghofer et al. | |
| 4,873,145 A | 10/1989 | Okada et al. | |
| 4,888,240 A | 12/1989 | Graham et al. | |
| 5,188,175 A | 2/1993 | Sweet | |
| 5,344,903 A | 9/1994 | Raiford et al. | |
| 5,468,715 A * | 11/1995 | Joseph .................. A01N 59/04 424/617 |
| 5,798,415 A | 8/1998 | Corpart et al. | |
| 5,964,291 A | 10/1999 | Bourne et al. | |
| 5,981,614 A | 11/1999 | Joseph | |
| 6,083,290 A | 7/2000 | Ikeda et al. | |
| 6,279,656 B1 | 8/2001 | Sinclair et al. | |
| 6,865,631 B2 | 3/2005 | Hofstee et al. | |
| 6,933,007 B2 * | 8/2005 | Fensel ...................... E04D 5/12 427/205 |
| 7,036,591 B2 | 5/2006 | Cannan et al. | |
| 7,291,358 B1 | 11/2007 | Fensel et al. | |
| 7,598,209 B2 | 10/2009 | Kaufman et al. | |
| 7,968,625 B2 | 6/2011 | Sawauchi et al. | |

(Continued)

*Primary Examiner* — Christine T Cajilig
(74) *Attorney, Agent, or Firm* — The Webb Law Firm

(57) ABSTRACT

Roofing systems are disclosed herein. In particular, a method of making an asphaltic roofing product having an asphaltic substrate and at least one granule disposed thereon is disclosed herein.

22 Claims, 3 Drawing Sheets

(56) References Cited

U.S. PATENT DOCUMENTS

| | | | |
|---|---|---|---|
| 8,586,184 | B2 | 11/2013 | Fukuda et al. |
| 8,865,303 | B2 * | 10/2014 | Sexauer .................... E04D 5/12 |
| | | | 428/317.1 |
| 8,865,931 | B2 | 10/2014 | Goossens et al. |
| 8,883,693 | B2 | 11/2014 | Eldred et al. |
| 9,175,210 | B2 | 11/2015 | Eldred et al. |
| 9,670,400 | B2 | 6/2017 | Eldred et al. |
| 10,077,395 | B2 | 9/2018 | Eldred et al. |
| 2002/0028857 | A1 * | 3/2002 | Holy ....................... C08L 1/288 |
| | | | 523/124 |
| 2003/0147821 | A1 | 8/2003 | Victor |
| 2004/0017938 | A1 | 1/2004 | Cooper et al. |
| 2005/0002996 | A1 | 1/2005 | Sojka |
| 2005/0129759 | A1 | 6/2005 | Sojka |
| 2007/0148340 | A1 * | 6/2007 | Kalkanoglu .............. E04D 5/12 |
| | | | 428/323 |
| 2007/0148342 | A1 * | 6/2007 | Kalkanoglu .............. C09D 5/14 |
| | | | 428/143 |
| 2011/0086201 | A1 * | 4/2011 | Shiao ...................... C04B 35/10 |
| | | | 264/679 |
| 2011/0223385 | A1 * | 9/2011 | Shiao ................ C04B 35/62695 |
| | | | 428/404 |
| 2014/0271440 | A1 | 9/2014 | Constantz et al. |
| 2014/0287185 | A1 | 9/2014 | Moseley et al. |
| 2014/0329008 | A1 * | 11/2014 | Shiao ....................... E04D 5/12 |
| | | | 427/160 |
| 2015/0192698 | A1 * | 7/2015 | Joedicke ................... E04D 1/00 |
| | | | 252/587 |
| 2017/0175326 | A1 * | 6/2017 | Zhou ...................... D06N 5/003 |

* cited by examiner

SELF-CLEANING COOL ROOF SYSTEM

CROSS-REFERENCE TO RELATED APPLICATIONS

This application is a continuation of U.S. patent application Ser. No. 15/697,547 filed Sep. 7, 2017 which claims priority to U.S. Provisional Patent Application No. 62/399,850 filed Sep. 26, 2016. The above-mentioned applications are hereby incorporated by reference.

TECHNICAL FIELD

The present disclosure relates to cool roofing systems. In particular, the present disclosure relates to methods of making roofing systems containing reflective and self-cleaning granules.

BACKGROUND

Roofing materials, such as asphalt shingles, oftentimes contain solid particulates, called "granules," deposited on an asphaltic base material. The granules can include sand or ceramic materials suitable for blocking ultraviolent light and provide physical protection of the asphaltic base material. These granules are oftentimes dark in color, which are prone to absorbing heat and thus reducing efficiencies of the HVAC systems in the underlying building. Roofing materials are also usually designed to last for several years, but prolonged exposure to sunlight, rain and other outside elements can reduce the average lifespan of the roofing materials. For example, frequent and/or intense rainstorms can dislodge shingles from the underlying roof, dislodge the solid particulates from the asphaltic base material or cause buildup of organic material, such as moss, mold and mildew, thereby reducing a solar reflectiveness of the roof.

What is needed, therefore, is a method of making resilient roofing material that can reflect ultraviolet light for an extended period of time.

SUMMARY

In at least one embodiment, method of making a self-cleaning cool roof system. Granule particulates selected from the group consisting of kaolin clays, bauxite clays, alumina and combinations thereof are mixed with a reflective material selected from the group consisting of alumina, titanium dioxide, zinc oxide, aluminum hydroxide, aluminum oxyhydroxide, alumina trihydrate and combinations thereof to produce granule having a reflectivity of at least about 80%. The granule are deposited directly onto a top surface of an asphaltic substrate, wherein the granule adhere to the asphaltic substrate.

BRIEF DESCRIPTION OF THE DRAWINGS

The present disclosure may best be understood by referring to the following description and accompanying drawings that are used to illustrate embodiments of the disclosure. In the drawings.

DETAILED DESCRIPTION

Figure 1:
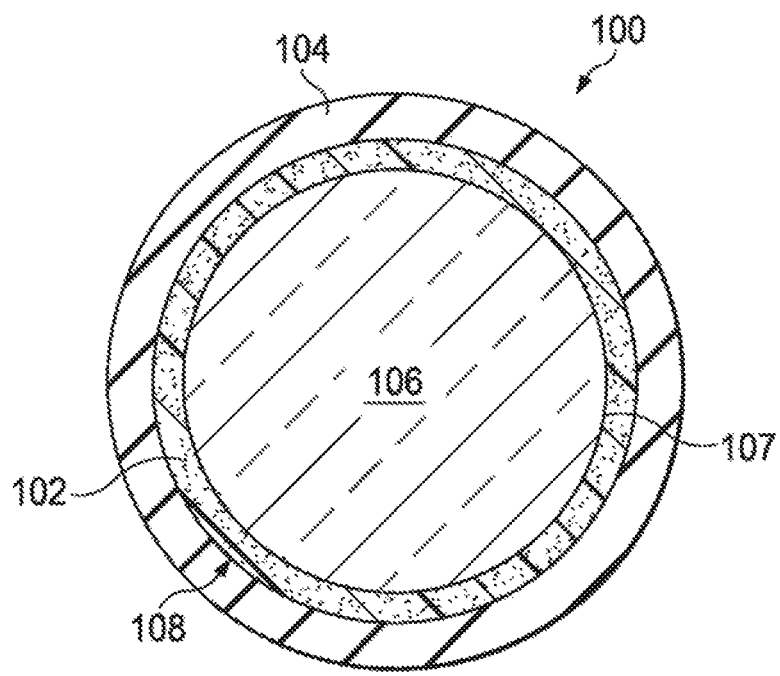
FIG. 1 is a cross sectional view of a coated granule containing a chemical treatment agent disposed between a coating and a granule particulate in accordance with several exemplary embodiments described herein.

In the following description, numerous specific details are set forth. However, it is understood that embodiments of the present disclosure may be practiced without these specific details. In other instances, well-known structures and techniques have not been shown or described in detail in order not to obscure the understanding of this description. Additionally, as used herein, the term "exemplary" is intended to mean serving as an illustration or example and is not intended to indicate a preference.

The term "apparent specific gravity," as used herein, is the weight per unit volume (grams per cubic centimeter) of the granules, including the internal porosity. The apparent specific gravity values given herein were determined by the Archimedes method of liquid (water) displacement according to API RP60, a method which is well known to those of ordinary skill in the art. For purposes of this disclosure, methods of testing the characteristics of the granule in terms of apparent specific gravity are the standard API tests that are routinely performed on granule samples.

The term "internal interconnected porosity," as used herein, means a percentage of the pore volume, or void volume space, over the total volume of a porous ceramic particulate.

The term "degradable," as used herein, means the ability of a chemical or coating to react to dissolve or breakdown into smaller components under one or more downhole conditions.

The term "infuse," as used herein, means to inject, attach, introduce, or otherwise include a material into a porous substrate, such as a porous ceramic.

The term "ceramic," as used herein, means any non-metallic, inorganic solid material.

The term "ceramic granule," as used herein, means any man-made or synthetic ceramic particulate(s).

The term "granule," as used herein, means material that includes one or more (e.g., tens, hundreds, thousands, millions, or more) of individual granule particulates or elements.

Described herein are roofing systems containing an asphaltic substrate having one or more granules deposited thereon. The granules can be formed from sintered kaolin clays, bauxite clays, alumina, and combinations thereof. The granules can also contain one or more reflective materials. The reflective materials can include alumina, titania (titanium dioxide), zinc oxide, aluminum hydroxide, aluminum oxyhydroxide, alumina trihydrate (ATH), and combinations thereof. The reflective materials can be mixed with or otherwise combined with the kaolin clays, bauxite clays, or alumina prior to, during, or after sintering.

The granules can also contain one or more chemical treatment agents. The chemical treatment agents can include corrosion inhibitors, organic deposition inhibitors, biocides, algaecides, enzymes, biological agents, surfactants and combinations thereof. The chemical treatment agents can be disposed on, attached to, coated on, infused into, combined with, or otherwise contained on or in the granules to produce a granule containing the one or more chemical treatment agents, also referred to as a chemical treatment agent containing granule.

The chemical treatment agents can include hydrophobic, oleophobic and/or amphiphobic material(s). In one or more exemplary embodiments, the granules can include a hydrophobic, oleophobic or amphiphobic coating on its outer surface(s). In one or more exemplary embodiments, the one or more granules can have an internal porosity that can be at least partially infused with hydrophobic, oleophobic or amphiphobic material(s). For example, the granules can have hydrophobic properties and/or oleophobic properties.

The granules can be incorporated into any suitable roofing material(s). Suitable roofing materials and systems containing granules and processes for making the same are generally shown and described in U.S. Pat. Nos. 6,933,007, 7,291,358 and 8,865,303 and U.S. Application Publication No. 2004/0017938, each of which are incorporated by reference herein in their entirety. The roofing systems disclosed herein can include one or more asphaltic substrates or layers, such as a layer of bitumen or modified bitumen. Each layer or layers of bitumen or modified bitumen can include one or more layers of a reinforcing material, for example, polyester or fiberglass. The granules can be deposited directly onto a top surface of the uppermost bitumen or asphaltic layer. In one or more exemplary embodiments, the granules are adhered to or embedded within the top surface to provide a granule layer.

In one or more exemplary embodiments, the granule can be or include natural sand. In one or more exemplary embodiments, the granule can be or include a ceramic granule. The ceramic granule can be or include a porous ceramic granule or a non-porous ceramic granule.

The granules can be or include silica and/or alumina in any suitable amounts. According to several exemplary embodiments, the granules include less than 80 wt %, less than 60 wt %, less than 40 wt %, less than 30 wt %, less than 20 wt %, less than 10 wt %, or less than 5 wt % silica based on the total weight of the granules. According to several exemplary embodiments, the granules include from about 0.1 wt % to about 70 wt % silica, from about 1 wt % to about 60 wt % silica, from about 2.5 wt % to about 50 wt % silica, from about 5 wt % to about 40 wt % silica, or from about 10 wt % to about 30 wt % silica. According to several exemplary embodiments, the granules include at least about 30 wt %, at least about 50 wt %, at least about 60 wt %, at least about 70 wt %, at least about 80 wt %, at least about 90 wt %, or at least about 95 wt % alumina based on the total weight of the granule. According to several exemplary embodiments, the granules includes from about 30 wt % to about 99.9 wt % alumina, from about 40 wt % to about 99 wt % alumina, from about 50 wt % to about 97 wt % alumina, from about 60 wt % to about 95 wt % alumina, or from about 70 wt % to about 90 wt % alumina.

According to several exemplary embodiments, the granule compositions disclosed herein include granules that are substantially round and spherical having a size in a range between about 6 and about 270 U.S. Mesh. For example, the size of the particulate can be expressed as a grain fineness number (GFN) from about 15 to about 300, or from about 30 to about 110, or from about 40 to about 70. According to such examples, a sample of sintered particles can be screened in a laboratory for separation by size, for example, intermediate sizes between 20, 30, 40, 50, 70, 100, 140, 200, and 270 U.S. mesh sizes to determine GFN. The correlation between sieve size and GFN can be determined according to Procedure 106-87-S of the American Foundry Society Mold and Core Test Handbook, which is known to those of ordinary skill in the art.

The granule compositions disclosed herein include granules having any suitable size. For example, the granule can have a mesh size of at least about 6 mesh, at least about 10 mesh, at least about 16 mesh, at least about 20 mesh, at least about 25 mesh, at least about 30 mesh, at least about 35 mesh, or at least about 40 mesh. According to several exemplary embodiments, the granule has a mesh size from about 6 mesh, about 10 mesh, about 16 mesh, or about 20 mesh to about 25 mesh, about 30 mesh, about 35 mesh, about 40 mesh, about 45 mesh, about 50 mesh, about 70 mesh, or about 100 mesh. According to several exemplary embodiments, the granule has a mesh size from about 4 mesh to about 120 mesh, from about 10 mesh to about 60 mesh, from about 16 mesh to about 20 mesh, from about 20 mesh to about 40 mesh, or from about 25 mesh to about 35 mesh.

The granules disclosed herein can be manufactured according to any suitable process including, but not limited to continuous spray atomization, spray fluidization, drip casting, spray drying, or compression. Suitable granules and methods for manufacture are disclosed in U.S. Pat. Nos. 4,068,718, 4,427,068, 4,440,866, 5,188,175, 7,036,591, 8,865,631, 8,883,693, 9,175,210, 9,670,400 and 10,077,395, the entire disclosures of which are incorporated herein by reference. In forming the granules, the ceramic raw material, such as a kaolin-based raw material, can be combined with an aqueous solution to form a slurry. At least a portion of the slurry of ceramic raw material can be formed into green pellets using any suitable means, such as via a fluidizer or vibration-induced dripping. As used herein, the term "green pellets" refers to substantially round and spherical particles which have been formed from the slurry but are not sintered.

The granules disclosed herein can have any suitable reflectivity. In one or more exemplary embodiments, the granules can have a reflectivity of at least about 50%, at least about 60%, at least about 70%, at least about 80%, at least about 85%, at least about 90%, or at least about 95%. The granules disclosed herein can include ATH in any suitable amounts to provide a desired reflectivity. The granules can include at least about 1 wt %, at least about 2 wt %, at least about 4 wt %, at least about 6 wt %, or at least about 8 wt % ATH based on the weight of the granules. The ATH can be incorporated into and/or onto the granules in any suitable manner. For example, the ATH can be formed on or coated on the outer surfaces of the sintered granules and/or the green pellets, prior to sintering. When ATH is formed on or coated on the outer surfaces of the granules and/or the green pellets, the granules can have an ATH concentration of about 0.1 wt %, about 0.5 wt %, about 1 wt %, about 2 wt %, or about 4 wt % to about 6 wt %, about 8 wt %, about 10 wt %, about 15 wt %, or about 20 wt %. In one or more exemplary embodiments, an ATH-containing solution can be sprayed onto the green pellets to provide ATH-containing granules. In one or more exemplary embodiments, the ATH can be mixed with the slurry and incorporated throughout the green pellets. When ATH is incorporated into the slurry, the granules can have an ATH concentration of about 1 wt %, about 2 wt %, about 5 wt %, about 7 wt %, or about 9 wt % to about 11 wt %, about 13 wt %, about 15 wt %, about 20 wt %, or about 25 wt %.

According to several exemplary embodiments, the granule compositions disclosed herein include porous and/or non-porous granules. The granule compositions disclosed herein include granules having any suitable shape. The granules can be substantially round, cylindrical, square, rectangular, elliptical, oval, egg-shaped, or pill-shaped.

The granules can have any suitable specific gravity. The granules can have an apparent specific gravity of at least about 2.5, at least about 2.7, at least about 3, at least about 3.3, or at least about 3.5. For example, the granules can have an apparent specific gravity of about 2.5 to about 4.0, about 2.7 to about 3.8, about 3.5 to about 4.2, about 3.8 to about 4.4, or about 3.0 to about 3.5. In one or more exemplary embodiments, the granules can have a specific gravity of less than about 4 glee, less than about 3.5 glee, less than about 3 glee, less than about 2.75 glee, less than about 2.5 glee, less than about 2.25 glee, less than about 2 glee, less than about 1.75 glee, or less than about 1.5 glee. For example, the granules can have a specific gravity of about 1.3 glee to about 3.5 glee, about 1.5 glee to about 3.2 glee, about 1.7 glee to about 2.7 glee, about 1.8 glee to about 2.4 glee, or about 2.0 glee to about 2.3 glee.

The granules can have any suitable bulk density. In one or more exemplary embodiments, the granules have a bulk density of less than about 3 glee, less than about 2.5 glee, less than about 2.2 glee, less than about 2 glee, less than about 1.8 glee, less than about 1.6 glee, or less than about 1.5 glee. The granules can have a bulk density of about 1 glee, about 1.15 glee, about 1.25 glee, about 1.35 glee, or about 1.45 glee to about 1.5 glee, about 1.6 glee, about 1.75 glee, about 1.9 glee, or about 2.1 glee or more. For example, the granules can have a bulk density of about 1.3 glee to about 1.8 glee, about 1.35 glee to about 1.65 glee, or about 1.5 glee to about 1.9 glee.

The granules can have any suitable surface roughness. The granules can have a surface roughness of less than 5 µm, less than 4 µm, less than 3 µm, less than 2.5 µm, less than 2 µm, less than 1.5 µm, or less than 1 µm. For example, the granules can have a surface roughness of about 0.1 µm to about 4.5 µm, about 0.4 µm to about 3.5 µm, or about 0.8 µm to about 2.8 µm.

The granules can have any suitable pore size distribution. For example, the granules can have a standard deviation in pore size of less than about 6 µm, less than about 4 µm, less than about 3 µm, less than about 2.5 µm, less than about 2 µm, less than about 1.5 µm, or less than about 1 µm. The granules can have any suitable average maximum or largest pore size. For example, the granules can have an average largest pore size of less than about 25 µm, less than about 20 µm, less than about 18 µm, less than about 16 µm, less than about 14 µm, or less than about 12 µm. The granules can have any suitable concentration of pores. For example, the granules can have less than about 5,000, less than about 4,500, less than about 4,000, less than about 3,500, less than about 3,000, less than about 2,500, or less than about 2,200 visible pores at a magnification of 500× per square millimeter of a granule.

The granules can have any suitable porosity. According to several exemplary embodiments, the granules can be or include porous ceramic granules having any suitable porosity. The granules can have an internal interconnected porosity of greater than 5%, greater than 10%, greater than 15%, greater than 20%, or greater than 25%. In several exemplary embodiments, the granules can have an internal interconnected porosity from about 1%, about 2%, about 4%, about 6%, about 8%, about 10%, about 12%, about 14%, or about 16% to about 18%, about 20%, about 22%, about 24%, about 26%, about 28%, about 30%, about 34%, about 38%, about 45%, about 55%, about 65%, or about 75% or more. In several exemplary embodiments, the internal interconnected porosity of the porous ceramic granule is from about 5% to about 75%, about 5% to about 15%, about 10% to about 30%, about 15% to about 35%, about 25% to about 45%, about 30% to about 55%, or about 35% to about 70%. According to several exemplary embodiments, the porous ceramic granule can have any suitable average pore size. For example, the porous ceramic granule can have an average pore size from about 2 nm, about 10 nm, about 15 nm, about 55 nm, about 110 nm, about 520 nm, or about 1,100 to about 2,200 nm, about 5,500 nm, about 11,000 nm, about 17,000 nm, or about 25,000 nm or more in its largest dimension. For example, the porous ceramic granule can have an average pore size can be from about 3 nm to about 30,000 nm, about 30 nm to about 18,000 nm, about 200 nm to about 9,000, about 350 nm to about 4,500 nm, or about 850 nm to about 1,800 nm in its largest dimension.

The granule compositions disclosed herein can be or include hydrophobic granules. The hydrophobic granules can have a hydrophobic component and a granule component. For example, the hydrophobic granules can include a granule having one or more coatings of a hydrophobic material on its outer surface(s). The hydrophobic material can include silicon containing compounds, including silicone materials and siloxanes, polytetrafluoroethylene (commonly known as Teflon™), plant oils, such as linseed oil, soybean oil, corn oil, cottonseed oil, vegetable oil (widely commercially available such as Crisco™), and canola oil, and hydrocarbons such as kerosene, diesel, and crude oil, petroleum distillates such as hydrocarbon liquids comprising a mixture of C7-C12 aliphatic and alicyclic hydrocarbons and aromatic hydrocarbons (C7-C12), commonly known as Stoddard Solvent, aliphatic solvents, solvent naphtha (medium aliphatic and light aromatic), and paraffin, such as solvent dewaxed heavy paraffinic petroleum distillate. According to the present disclosure, the coating is applied to the granule by one or more of a variety of techniques well known to those of ordinary skill in the art including chemically coating the granule by means of spraying, dipping or soaking the granule in a liquid solution of the hydrophobic material, application of a sheet of film such as copolymerized polyvinylidene chloride (commercially available as Saran Wrap™) to essentially "shrink-wrap" the granule and encapsulate it in a chemically desirable coating, fusing material to the granule in a manner similar to that utilized to fuse toner in a laser printer by placing heated granule into a fusible powder such as a glass frit or enamel which will bond to the granule, electroplating using electrostatic techniques well known to those of ordinary skill in the art to transfer a coating material such as a less chemically reactive metallic layer to the granule, plasma spraying, sputtering, fluidizing the granule in a fluidized bed such as according to techniques described in U.S. Pat. No. 4,440,866, the entire disclosure of which is incorporated herein by reference, and powder coating. Those of ordinary skill in the art will recognize that other techniques may also be used to suitably apply a substantially uniform consistent coating to the granule. Those of ordinary skill in the art will also recognize that the granule may be coated with a solid coating, such as glass frit, high alumina clays or bauxites, metals, or other hydrophobic powders. Such coatings could be applied by spraying, tumbling, or other means known in the art for applying powder coatings.

One such coating according to the present disclosure may be generally described as a silicon containing compound. In certain embodiments of the present disclosure, the silicon containing compound is a siloxane based on the structural unit —R2SiO-, wherein R is an alkyl group. In other certain embodiments of the present disclosure, the silicon containing compound is a nonvolatile linear siloxane of the composition:

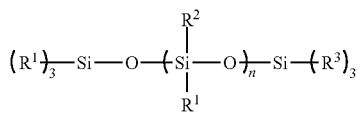

where ($R^1$) is an alkyl group having from one to three carbon atoms, ($R^2$) is either a hydrogen atom or an alkyl group having from one to three carbon atoms, ($R^3$) is an alkyl group having from one to four carbon atoms and n is a number between 50 and 200. In still other certain embodiments of the present disclosure, the suitable silicon containing compounds include polymethylhydrogen siloxane and polydimethyl siloxane.

The granule compositions disclosed herein can be or include amphiphobic granules. The amphiphobic granules can have a hydrophobic component and an oleophobic component. For example, the amphiphobic granule can include a granule having one or more coatings of a hydrophobic material, one or more coatings of an oleophobic material or any combination thereof. In one or more exemplary embodiments, the granule is coated with a single coating having both hydrophobic and oleophobic properties.

In one or more exemplary embodiments, the amphiphobic coating can be or include any suitable material having both hydrophobic and oleophobic properties. In one or more exemplary embodiments, the amphiphobic coating can be or include one or more fluoropolymers. The one or more fluoropolymers can include one or more fluorinated poly (acrylates), one or more fluorinated silanes, one or more fluorinated siloxanes, or any combinations thereof. In one or more exemplary embodiments, the amphiphobic material includes one or more fluorinated poly(acrylates).

In one or more exemplary embodiments, the fluorinated poly(acrylates) can include monomers such as fluorohexyl acrylate, fluoroaryl acrylate, 2-(perfluorooctyl)ethyl acrylate, heptafluorobutyl acrylate, IH,1H,9H-hexadecafluorononyl acrylate, 2,2,3,4,4,4-hexafluorobutyl acrylate, hexafluoroisopropyl acrylate, IH,1H,5H-octafluoropentyl acrylate, pentafluorobenzyl acrylate, pentafluorophenyl acrylate, perfluorocyclohexyl methyl acrylate, perfluoroheptoxypoly(propyloxy) acrylate, perfluorooctyl acrylate, IH, IH perfluorooctyl acrylate, 2,2,3,3-tetrafluoropropyl acrylate, 2,2,2-trifluoroethyl acrylate, 3-(trifluoromethyl)benzyl acrylate, 2-(N-butylperfluorooctanesulfamido) ethyl acrylate, IH, IH,7H-dodecafluoroheptyl acrylate, IH, IH, 1 IH-eicosafluoroundecyl acrylate, trihydroperfluoroundecyl acrylate, trihydroperfluoroheptyl acrylate, and/or 2-(N-ethylperfluorooctane sulfamido) ethyl acrylate. In one or more exemplary embodiments, the fluorinated poly(acrylates) can include fluorinated polymethacrylates. The fluorinated polymethacrylates can include monomers such as, for example, 2-(perfluorooctyl)ethyl methacrylate (FOEMA), fluorohexyl methacrylate, fluoroaryl methacrylate, IH, IH,7H-dodecafluoroheptyl methacrylate, trihydroperfluoroheptyl methacrylate, trihydroperfluoroundecyl methacrylate, 2-(N-ethylperfluorooctane sulfamido) ethyl methacrylate, tetrahydroperfluorodecyl methacrylate, IH, IH-heptafluoro-n-butyl methacrylate, 11-1,1H,9H-hexadecafluorononyl methacrylate, 2,2,3,4,4,4-hexafluorobutyl methacrylate, hexafluoroisopropyl urethane of isocyanatoethyl methacrylate, IH,1H,5H-octafluoropentyl methacrylate, pentafluorobenzyl methacrylate, pentafluorophenyl methacrylate, perfluorocyclohexylmethy1 methacrylate, perfluoroheptoxypoly(propyloxy)methacrylate, IH, IH-perfluorooctyl methacrylate, 2,2,3,3-tetrafluoropropyl methacrylate, 2,2,2-trifluoroethyl methacrylate, 3-(trifluoromethyl)benzyl methacrylate, and/or hexafluoroisopropyl methacrylate.

In one or more exemplary embodiments, the fluorinated poly(acrylates) can include fluorinated polydiacrylates. The fluorinated polydiacrylates can include monomers such as, for example, hexafluoro bisphenol diacrylate, 2,2,3,3,4,4,5,5-octafluoro-1,6-hexanediol diacrylate, polyperfluoroethylene glycol diacrylate, and/or 2,2,3,3-tetrafluoro-1,4-butanediol diacrylate.

In one or more exemplary embodiments, the fluorinated poly(acrylates) can include fluorinated polydimethacrylates. The fluorinated polydimethacrylates can include monomers such as, for example, hexafluoro bisphenol a dimethacrylate, 2,2,3,3,4,4,5,5-octafluoro-1,6-hexanediol dimethacrylate, perfluorocyclohexyl-1,4-dimethyl dimethacrylate, polyperfluoroethylene glycol dimethacrylate, and/or 2,2,3,3-tetrafluoro-1, 4-butanediol dimethacrylate.

The one or more fluorinated poly(acrylates) can be the reaction product of one or more acrylate monomers having a fluorine-containing group. The acrylate monomer having a fluorine-containing group can include a monomer having:
(i) at least one fluorine-containing group selected from the group of a fluoroalkyl group, a fluoroalkenyl group and a fluoroether group, and
(ii) an unsaturated group of the formula:

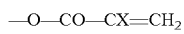

wherein X is a hydrogen atom, an alkyl group having 1 to 6 carbon atoms, a fluorine atom, a chlorine atom, a bromine atom, an iodine atom, a CFX1X2 group (in which X1 and X2 are each a hydrogen atom, a fluorine atom, a chlorine atom, a bromine atom or an iodine atom), a cyano group, a linear or branched fluoroalkyl group having 1 to 21 carbon atoms, a substituted or unsubstituted benzyl group, or a substituted or unsubstituted phenyl group.

In one or more exemplary embodiments, the acrylate monomer having the fluorine-containing group is represented by the formula:

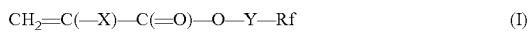

wherein X is a hydrogen atom, an alkyl group having 1 to 6 carbon atoms, a fluorine atom, a chlorine atom, a bromine atom, an iodine atom, a —CFX1X2 group (in which X1 and X2 are independently a hydrogen atom, a fluorine atom, a chlorine atom, a bromine atom or an iodine atom), a cyano group, a linear or branched fluoroalkyl group having 1 to 21 carbon atoms, a substituted or unsubstituted benzyl group, or a substituted or unsubstituted phenyl group, wherein Y is a direct bond, an aliphatic group having 1 to 10 carbon atoms which optionally has an oxygen atom, an aromatic, cycloaliphatic or aral</phatic group having 6 to 10 carbon atoms which optionally has an oxygen atom, a —CH2CH2N (R1)S0 2- group (in which R1 is an alkyl group having 1 to 4 carbon atoms) or a —CH2CH(OY1)CH2- group (in which Y1 is a hydrogen atom or an acetyl group), and wherein Rf is a linear or branched fluoroalkyl group having 1 to 7 carbon atoms, a linear or branched fluoroalkenyl group having 2 to 7 carbon atoms, or a fluoroether group having totally 1 to 200 repeating units selected from the group of the repeating units: —C3F6O—, —C2F4O— and —CF2O—.

When the Rf group in the formula (I) is a fluoroalkyl group, the Rf group can include —CF3, —CF2CF3, —CF2CF2CF3, —CF(CF3)2, —CF2CF2CF2CF3, —CF2CF(CF3)2, —C(CF3)3, —(CF2)4CF3, —(CF2)2CF(CF3)2, —CF2C(CF3)3, —CF(CF3)CF2CF2CF3, —(CF2)sCF3, —(CF2)3CF(CF3)2, —(CF2)4CF(CF3)2, —(CF2)2H, —CF2CFHCF3, —(CF2)4H and —(CF2)6H. When the Rf group is the fluoroalkyl group, the carbon atom number of the Rf group can be from 1 to 7, from 2 to 6, or from 4 to 6.

When the Rf group in the formula (I) is the fluoroalkenyl group, the Rf group can include —CF=CF(CF3), —CF=C(CF3)2, —CF=C(CF3)(CF2CF3), —CF=C(CF3)(CF(CF3)2), —C(CF3)=CF(CF(CF3) 2) and —C(CF2CF3)=C(CF3)2. When the Rf group is the fluoroalkenyl group, the carbon atom number of the Rf group can be from 2 to 7 or from 3 to 6.

When the Rf group in the formula (I) is the fluoroether group, the Rf group has at least one type of repeating unit (oxyperfluoroalkylene group) selected from the group of —C3F6O—, —C2F4O— and —CF2O—. The total number of oxyperfluoroalkylene repeating units can be from 1 to 200, from 1 to 100, or from 5 to 50. The fluoroether group can have an end group directly bonding to the oxyperfluoroalkylene repeating unit. Examples of the end group include a hydrogen atom, a halogen atom (for example, a fluorine atom), an alcohol group (for example, HOCH 2-), an epoxy group, an amine group (for example, H2N—), a carboxylic acid group (for example, HOOC—), an acid halide group (for example, F(O)C—) and a chloromethyl group (ClH2C—). The fluoroether group can have a fluoroalkylene group having 1 to 10 (preferably 1 to 3) carbon atoms, particularly a perfluoroalkylene group, in addition to the oxyperfluoroalkylene repeating unit and the end group. Examples of the fluoroalkylene group having 1 to 10 carbon atoms include —CF2— and —CF2CF2—.

In the formula (I) is an aliphatic group having 1 to 10 carbon atoms. The aliphatic group can be an alkylene group having 1 to 4 carbon atoms.

In other exemplary embodiments, the acrylate monomer having a fluorine-containing group can be or include the following:

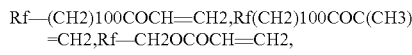
Rf—(CH2)100COCH=CH2,Rf(CH2)100COC(CH3)=CH2,Rf—CH2OCOCH=CH2,

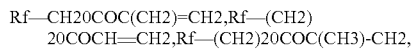
Rf—CH2OCOC(CH2)=CH2,Rf—(CH2)20COCH=CH2,Rf—(CH2)20COC(CH3)-CH2,

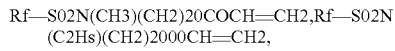
Rf—SO2N(CH3)(CH2)2OCOCH=CH2,Rf—SO2N(C2Hs)(CH2)2OOOCH=CH2,

Rf—CH2CH(OCOCH3)CH2OCOC(CH3)=CH2,Rf—CH2CH(OH)CH2OCOCH=CH2.

In one or more exemplary embodiments, the one or more fluoropolymers can include one or more fluorinated poly(acrylates) based on the structural unit C6F13CH=CHROCOCH=CH2. For example, the one or more fluoropolymers can include one or more fluorinated poly(acrylates) containing a combination of repeating units derived from the monomer C6F13CH=CHROCOCH=CH2, wherein R is selected from the group of (—CHr)1.6, (—CH2OCH2CH2-)1-6, and (—OCH2CH2CH2-)1-6.

In one or more exemplary embodiments, the one or more fluoropolymers can be in the form of an aqueous fluoropolymer dispersion. The fluoropolymer dispersion can include a liquid medium, namely water, or a mixture of water with a water-soluble organic solvent. The water-soluble organic solvent can include an alcohol such as methanol, ethanol, n-propanol and isopropanol; and a ketone such as acetone. The fluoropolymer dispersion can include the fluoropolymer in any suitable amounts. In one or more exemplary embodiments, the fluoropolymer dispersion can have a fluoropolymer concentration of about 1 wt %, about 4 wt %, about 6 wt %, about 8 wt %, or about 10 wt % to about 12 wt %, about 15 wt %, about 20 wt %, about 30 wt %, about 40 wt %, or about 50 wt % or more. In one or more exemplary embodiments, the fluoropolymer dispersion can have a water concentration of about 50 wt %, about 60 wt %, about 70 wt %, about 80 wt %, about 85 wt %, or about 88 wt % to about 90 wt %, about 92 wt %, about 94 wt %, about 96 wt %, or about 99 wt % or more. In one or more embodiments, the fluoropolymer dispersion can have a water-soluble organic solvent concentration of about 0.01 wt %, about 0.05 wt %, about 0.1 wt %, about 1 wt %, or about 2 wt % to about 4 wt %, about 8 wt %, or about 12 wt % or more.

In one or more exemplary embodiments, the fluoropolymer dispersion can be or include UNIDYNE™ TG-5601, UNIDYNE™ TG-5541, UNIDYNE™ TG-5543, UNIDYNE™ TG-5502, or UNIDYNE™ TG-8111, each commercially available from Daikin Industries, Ltd. In one or more exemplary embodiments, the fluoropolymer dispersion can be or include STAINGUARD-WB™, commercially available from Chemical Products Industries, Inc. The amphiphobic coating can be or include any suitable coating or material disclosed in U.S. Pat. Nos. 5,344,903, 5,798,415, 5,981,614, 7,968,625, and 8,586,184, each of which are incorporated by reference herein in its entirety.

The amphiphobic coating can have any suitable thickness. In one or more exemplary embodiments, the coating of amphiphobic material can have an average thickness ranging from about 1 nm, about 5 nm, about 15 nm, about 25 nm, about 50 nm, or about 100 nm to about 200 nm, about 400 nm, about 500 nm, about 750 nm, about 1,000 about 1,500 nm, about 2,000 nm, or about 5,000 nm.

The amphiphobic coating can at least partially penetrate any pores in the granule. For example, the amphiphobic material can be at least partially infused into an internal interconnected porosity of a porous granule. In one or more exemplary embodiments, the amphiphobic material can be at least partially coated on the interior walls of the pores contained in the porous granule.

The amphiphobic granule can have an outer surface having any suitable degree of hydrophobicity (water repellency) and/or oleophobicity (oil repellency). In one or more exemplary embodiments, the outer surface of the amphiphobic granule has a hydrophobicity value as measured by a water droplet contact angle of at least about 90°, at least about 100°, at least about 110°, at least about 120°, at least about 130°, or at least about 150°. In one or more exemplary embodiments, the outer surface of the amphiphobic granule has an oleophobicity value as measured by an oil droplet contact angle of at least about 90°, at least about 100°, at least about 110°, at least about 120°, at least about 130°, or at least about 150°.

In one or more exemplary embodiments, the chemical treatment agent can include any one or more of corrosion inhibitors, organic deposition inhibitors, biocides, algaecides, fungicides, enzymes, biological agents, combinations thereof, or any other chemical that can be helpful in the maintenance of roofing systems. Suitable corrosion inhibitors can include, but are not limited to, fatty imidazolines, alkyl pyridines, alkyl pyridine quaternaries, fatty amine quaternaries and phosphate salts of fatty imidazolines. Suitable algaecides include, but are not limited to, organic algaecides such as carbamates, triazines, quaternary ammonium compounds, and the like, inorganic compounds such as cuprous oxide, zinc oxide, titanium oxide, and the like, and/or metals such as copper and zinc. The algaecides can also include photocatalytic particles such as titanium dioxide, zinc oxide, and the like. Suitable fungicides include, but are not limited to, benzimidazoles, carbendazim, dicarboximides, and the like.

The chemical treatment(s) can be incorporated into and/or onto the granules disclosed herein in any suitable manner. FIG. 1 is a cross sectional view of a coated granule 100 containing a chemical treatment agent 102 disposed between a coating 104 and a granule 106 in accordance with one or more embodiments. The granule 106 can be or include any suitable granule, such as the granules disclosed herein. A layer 108 of chemical treatment agent 102 can be formed between the coating 104 and the granule 106. For example, the layer 108 of chemical treatment agent 102 can surround and/or be disposed on an outer surface 107 of the granule 106. The layer 108 of chemical treatment agent 102 can coat or cover at least about 10%, at least about 30%, at least about 50%, at least about 70%, at least about 90%, at least about 95%, or at least about 99% of the entire outer surface area of the granule 106. For example, the layer 108 of chemical treatment agent 102 can coat or cover about 100% of the entire outer surface area of the granule 106. The coating 104 can coat or cover at least about 10%, at least about 30%, at least about 50%, at least about 70%, at least about 90%, at least about 95%, or at least about 99% of the entire outer surface area of the layer 108 of chemical treatment agent 102 disposed on the granule 106. For example, the coating 104 can coat or cover about 100% of the entire outer surface area of the granule 106 that is coated or covered by the layer 108 of chemical treatment agent 102 such that the layer 108 is disposed between the particulate 106 and the coating 104. The coating 104 can include any suitable resin material and/or epoxy resin material as disclosed herein. The coating 104 can be degradable or non-degradable, as shown in FIG. 1.

According to several exemplary embodiments, the chemical treatment agent 102 is present on the granule 106 in any suitable amount. According to several exemplary embodiments, the coated granule 100 contains at least about 0.01 wt %, at least about 0.1 wt %, at least about 0.5 wt %, at least about 1 wt %, at least about 2 wt %, at least about 4 wt %, at least about 6 wt %, or at least about 10 wt % chemical treatment agent 102 based on the total weight of the coated granule 100. According to several exemplary embodiments, the coating 104 is present on the granule 106 in any suitable amount. According to several exemplary embodiments, the coated granule 100 contains from about 0.01 wt %, about 0.2 wt %, about 0.8 wt %, about 1.5 wt %, about 2.5 wt %, about 3.5 wt %, or about 5 wt % to about 8 wt %, about 15 wt %, about 30 wt %, about 50 wt %, or about 80 wt % resin material, based on the total weight of the coated granule 100.

The layer 108 of the chemical treatment agent 102 can have any suitable thickness. The layer 108 can have thickness of at least about 0.1 nm, at least about 0.5 nm, at least about 1 nm, at least about 2 nm, at least about 4 nm, at least about 8 nm, at least about 20 nm, at least about 60 nm, at least about 100 nm, or at least about 200 nm. For example, the layer 108 can have thickness from about 1 nm, about 5 nm, about 10 nm, about 25 nm, about 50 nm, about 100 nm, or about 150 nm to about 200 nm, about 300 nm, about 500 nm, or about 1,000 nm or more.

Figure 2:
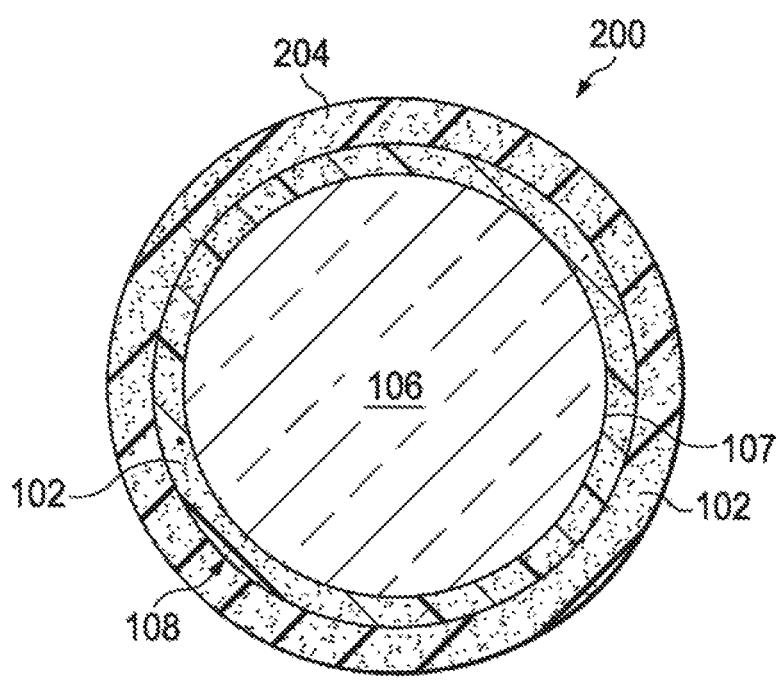
FIG. 2 is a cross sectional view of a coated granule containing a chemical treatment agent dispersed within a coating in accordance with several exemplary embodiments described herein.

FIG. 2 is a cross sectional view of a coated granule 200 containing the chemical treatment agent 102 dispersed within a coating 204 in accordance with one or more embodiments. The chemical treatment agent 102 can be homogenously or substantially homogeneously dispersed throughout the coating 204. The coating 204 can contain the chemical treatment agent 102 in any suitable amounts. For example, the coating 204 can have a chemical treatment agent 102 concentration of at least about 0.01 wt %, at least about 0.1 wt %, at least about 0.5 wt %, at least about 1 wt %, at least about 2 wt %, at least about 4 wt %, at least about 6 wt %, or at least about 10 wt % based on the weight of the coating 104. The coating 204 can include any suitable resin material and/or epoxy resin material as disclosed herein. The coating 204 can be degradable or non-degradable.

In one or more exemplary embodiments, the layer 108 of chemical treatment agent 102 can be formed between the coating 204 and the granule 106. For example, the layer 108 of chemical treatment agent 102 can surround and/or be deposited on an outer surface 107 of the granule 106 in any suitable manner as disclosed in reference to FIG. 1 above. The coated granule 200 can contain the chemical treatment agent 102 in any suitable amounts. According to several exemplary embodiments, the coated granule 200 contains from at least about 0.01 wt %, at least about 0.1 wt %, at least about 0.5 wt %, at least about 1 wt %, at least about 2 wt %, at least about 4 wt %, at least about 6 wt %, or at least about 10 wt % chemical treatment agent 102 based on the total weight of the coated granule 200. The coated granule 200 can contain the resin material in any suitable amounts. According to several exemplary embodiments, the coated granule 200 contains about 0.01 wt %, about 0.2 wt %, about 0.8 wt %, about 1.5 wt %, about 2.5 wt %, about 3.5 wt %, or about 5 wt % to about 8 wt %, about 15 wt %, about 30 wt %, about 50 wt %, or about 80 wt % resin material, based on the total weight of the coated granule 200.

Figure 3:
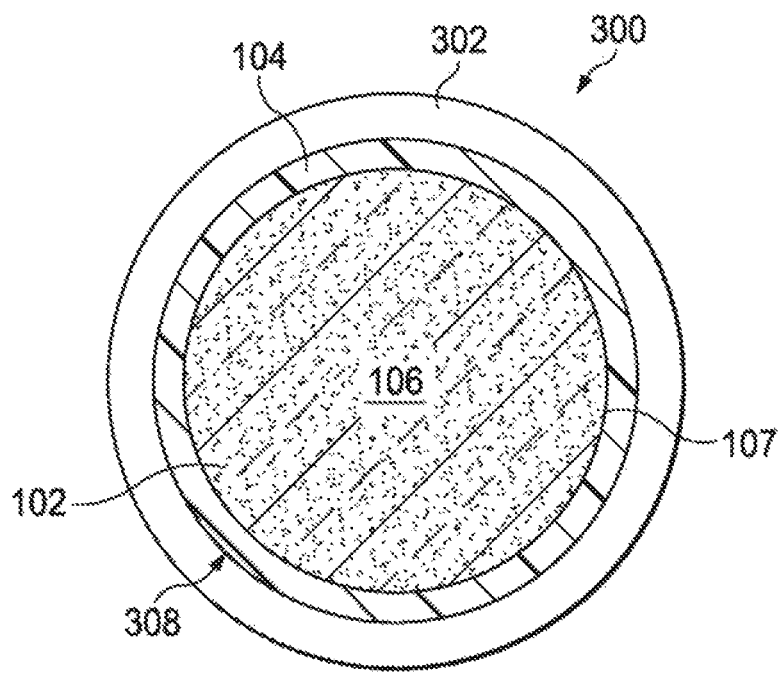
FIG. 3 is a cross sectional view of an encapsulated granule having a degradable, non-permeable shell encapsulating a coated granule, the coated granule containing a chemical treatment agent infused into a porous granule in accordance with several exemplary embodiments described herein.

FIG. 3 is a cross sectional view of an encapsulated granule 300 having a degradable, non-permeable shell 302 encapsulating a coated granule, the coated granule including the chemical treatment agent 102 infused into a porous granule 106 and surrounded by the resin coating 104. The resin coating 104 can be coated onto the porous granule 106. The degradable shell 302 can be directly or indirectly coated onto an outer surface 308 of the resin coating 104. The degradable shell 302 can coat or cover at least about 10%, at least about 30%, at least about 50%, at least about 70%, at least about 90%, at least about 95%, or at least about 99% of the entire outer surface area of the coated granule. For example, the degradable shell 302 can coat or cover about 100% of the entire outer surface area of the coated granule. The degradable shell 302 can coat or cover at least about 10%, at least about 30%, at least about 50%, at least about 70%, at least about 90%, at least about 95%, or at least about 99% of the entire outer surface 308 of the resin coating 104. For example, the coating can coat or cover about 100% of the entire outer surface area of the coated granule such that the resin coating 104 is disposed between the porous granule 106 and the degradable shell 302, as shown in FIG. 3.

The encapsulated granule 300 can contain the chemical treatment agent 102 in any suitable amounts. According to several exemplary embodiments, the encapsulated granule 300 contains at least about 0.01 wt %, at least about 0.1 wt %, at least about 0.5 wt %, at least about 1 wt %, at least about 2 wt %, at least about 4 wt %, at least about 6 wt %, or at least about 10 wt % chemical treatment agent 102 based on the total weight of the encapsulated granule 300. The encapsulated granule 300 can contain the resin coating 104 in any suitable amounts. According to several exemplary embodiments, the encapsulated granule 300 contains from about 0.01 wt %, about 0.2 wt %, about 0.8 wt %, about 1.5 wt %, about 2.5 wt %, about 3.5 wt %, or about 5 wt % to about 8 wt %, about 15 wt %, about 30 wt %, about 50 wt %, or about 80 wt % resin material, based on the total weight of the encapsulated granule 300.

Figure 4:
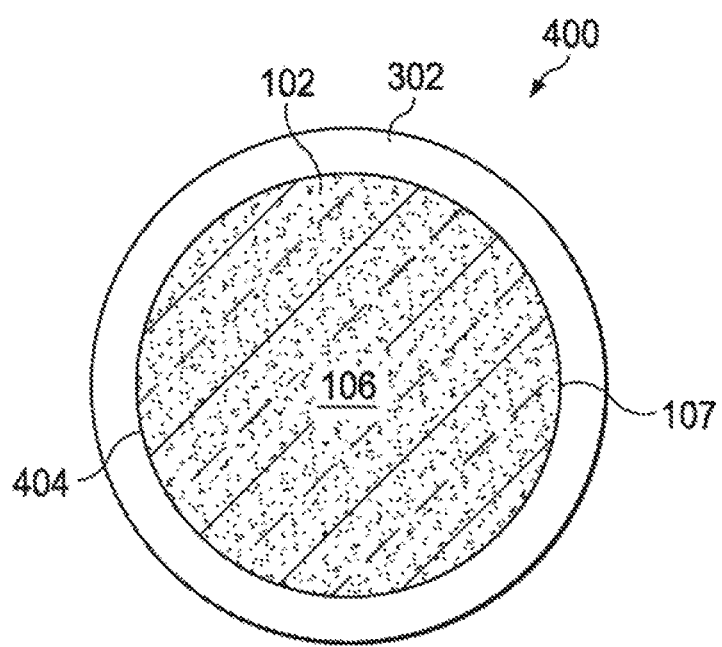
FIG. 4 is a cross sectional view of an encapsulated granule having a degradable, non-permeable shell encapsulating an uncoated granule, the uncoated granule containing a chemical treatment agent infused into a porous granule in accordance with several exemplary embodiments described herein.

The degradable shell 302 can also encapsulate any suitable configuration of granule. For example, FIG. 4 is a cross sectional view of an encapsulated granule 400 having the degradable, non-permeable shell 302 encapsulating an uncoated granule 404, the uncoated granule 404 containing the chemical treatment agent 102 infused into a porous granule 106. The degradable shell 302 can be directly or indirectly coated onto an outer surface 107 of the porous granule 106. The degradable shell 302 can coat or cover at least about 10%, at least about 30%, at least about 50%, at least about 70%, at least about 90%, at least about 95%, or at least about 99% of the entire outer surface area of the porous granule 106. For example, the degradable shell 302 can coat or cover about 100% of the entire outer surface area of the uncoated granule 404. The encapsulated granule 400 can contain the chemical treatment agent 102 in any suitable amounts. According to several exemplary embodiments, the encapsulated granule 400 contains at least about 0.01 wt %, at least about 0.1 wt %, at least about 0.5 wt %, at least about 1 wt %, at least about 2 wt %, at least about 4 wt %, at least about 6 wt %, or at least about 10 wt % chemical treatment agent 102 based on the total weight of the encapsulated granule 400.

Figure 5:
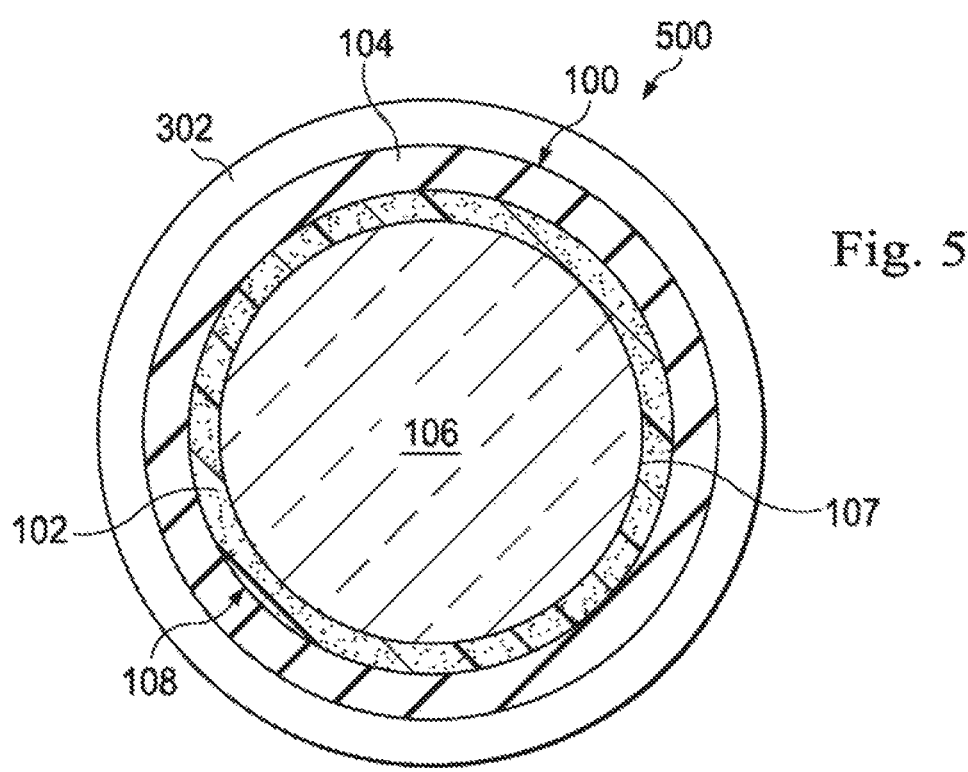
FIG. 5 is a cross sectional view of an encapsulated granule having a degradable, non-permeable shell encapsulating a coated granule, the coated granule containing a chemical treatment agent disposed between a resin coating and a granule in accordance with several exemplary embodiments described herein.

FIG. 5 is a cross sectional view of an encapsulated granule 500 having the degradable, non-permeable shell 302 encapsulating the coated granule 100 discussed above. For example, the degradable shell 302 can be directly or indirectly coated onto an outer surface of the resin coating 104 of the coated granule 100. The degradable shell 302 can coat or cover at least about 10%, at least about 30%, at least about 50%, at least about 70%, at least about 90%, at least about 95%, or at least about 99% of the entire outer surface area of the resin coating 104 of the coated granule 100. For example, the degradable shell 302 can coat or cover about 100% of the entire outer surface area of the resin coating 104. The degradable shell 302 can also cover, surround, and/or encapsulate the coated granule 200.

According to several exemplary embodiments, the degradable shell 302 is present in the encapsulated granule 300, 400, 500 in any suitable amount. According to several exemplary embodiments, the encapsulated granule 300, 400, 500 contains at least about 0.01 wt %, at least about 0.1 wt %, at least about 0.5 wt %, at least about 1 wt %, at least about 2 wt %, at least about 4 wt %, at least about 6 wt %, or at least about 10 wt % degradable shell 302 based on the total weight of the encapsulated granule 300, 400, 500. According to several exemplary embodiments, the encapsulated granule 300, 400, 500 contains about 0.01 wt %, about 0.2 wt %, about 0.8 wt %, about 1.5 wt %, about 2.5 wt %, about 3.5 wt %, or about 5 wt % to about 8 wt %, about 15 wt %, about 30 wt %, about 50 wt %, or about 80 wt % degradable shell 302, based on the total weight of the encapsulated granule 300, 400, 500.

According to several exemplary embodiments, the chemical treatment agent 102 is present in the encapsulated granule 300, 400, 500 in any suitable amount. According to several exemplary embodiments, the encapsulated granule 300, 400, 500 contains at least about 0.01 wt %, at least about 0.1 wt %, at least about 0.5 wt %, at least about 1 wt %, at least about 2 wt %, at least about 4 wt %, at least about 6 wt %, or at least about 10 wt % chemical treatment agent 102 based on the total weight of the encapsulated granule 300, 400, 500. According to several exemplary embodiments, the encapsulated granule 300, 400, 500 contains about 0.01 wt %, about 0.2 wt %, about 0.8 wt %, about 1.5 wt %, about 2.5 wt %, or about 3.5 wt % to about 5 wt %, about 8 wt %, about 12 wt %, or about 20 wt % chemical treatment agent 102, based on the total weight of the coated granule 300, 400, 500.

The degradable shell 302 of the encapsulated granule 300, 400, 500 can have any suitable thickness. The degradable shell 302 can have thickness of at least about 0.1 nm, at least about 0.5 nm, at least about 1 nm, at least about 4 nm, at least about 8 nm, at least about 15 nm, at least about 30 nm, at least about 60 nm, at least about 100 nm, at least about 200 nm, or at least about 500 nm. For example, the degradable shell 302 can have thickness from about 1 nm, about 10 nm, about 20 nm, about 50 nm, about 100 nm, about 150 nm, or about 200 nm to about 300 nm, about 500 nm, about 750 nm, or about 1,000 nm or more.

According to several exemplary embodiments, the coating 104, 204 can be or include a resin material and/or an epoxy resin material. Methods for coating granules with resins and/or epoxy resins are well known to those of ordinary skill in the art, for instance see U.S. Pat. No. 2,378,817 to Wrightsman, U.S. Pat. No. 4,873,145 to Okada and U.S. Pat. No. 4,888,240 to Graham, the entire disclosures of which are incorporated herein by reference.

According to one or more exemplary embodiments, the chemical treatment agent 102 is mixed with or otherwise added to the resin coating 104, 204 prior to coating the granules 106 with the resin coating 104, 204. For example, the chemical treatment agent 102 can be homogenously mixed with the coating 104, 204 prior to coating the granules 106 with the coating 104, 204.

According to one or more exemplary embodiments, the granules 106 are porous ceramic particulates infused with one or more chemical treatment agents 102. Methods for infusing porous ceramic particulates with chemical treatment agents are well known to those of ordinary skill in the art, such as those disclosed in U.S. Pat. Nos. 5,964,291 and 7,598,209, the entire disclosures of which are incorporated herein by reference. According to several exemplary embodiments, the porous ceramic particulates 106 act as a carrier for the chemical treatment agent 102 in a roofing system.

According to several exemplary embodiments, the coating 104, 204 can be or include a degradable coating. Specifically, as the coating degrades, the chemical treatment agent 102 is mixed with the coating 104, 204, disposed between the coating 104, 204 and the granule 106, and/or infused in the granule 106 can be released onto the roofing system. The amount and molecular weight of the degradable coating 104, 204 can be varied to provide for longer or shorter degrade times and tailored release of the chemical treatment agent 102.

According to certain embodiments, the degradable coating 104, 204 can include one or more of water-soluble polymers and cross-linkable water-soluble polymers. Suitable water-soluble polymers and cross-linkable water-soluble polymers are disclosed in U.S. Pat. No. 6,279,656, the entire disclosure of which is incorporated herein by reference. According to several exemplary embodiments in which the degradable coating 104, 204 includes one or more of water-soluble polymers and cross-linkable water-soluble polymers, the solubility parameters of such polymers can be controlled to adjust the timing of the solubility or degradation of the coating 104, 204. Such parameters can include molecular weight, the hydrophilic/lipophilic balance of the polymers, and the extent of cross-linking of the polymers. According to several exemplary embodiments, the degradable coating 104, 204 includes a degradable polymer such as polylactic acid, cellulose acetate, methyl cellulose or combinations thereof that can degrade over time to allow for the release of the infused chemical treatment agent 102 at different time intervals.

According to one or more exemplary embodiments, the degradable coating 104, 204 can degrade in any suitable manner. For example, the degradable coating 204 can degrade from the outside-in, such that the outer surface of the coating 204 degrades first, resulting in controlled release of chemical treatment agent 102 blended with the coating 204. These degradable coating coatings 204 can include self-polishing coatings. The self-polishing coatings can include self-polishing copolymers having chemical bonds that are gradually hydrolyzed by water, such as rainwater. The self-polishing coating can release chemical treatment agents 102 gradually, over time, due to the nature of the degradation of the coating 204 from its outermost surface towards its innermost surface, the degradation caused by the coating being gradually hydrolyzed by water.

According to several exemplary embodiments, the granules 106 can be coated with a polymeric material that forms a semi-permeable polymeric coating 104, 204 that is substantially non-degradable in the presence of fluids but permits the chemical treatment agent to leach, elute, diffuse, bleed, discharge, desorb, dissolve, drain, seep, or leak through the polymeric coating so as to release the chemical treatment agent 102 onto the roof or surrounding area. The amount and molecular weight of the semi-permeable substantially non-degradable polymeric coating 104, 204 can be varied to provide for longer or shorter release times for tailored release of the chemical treatment agents 102. According to several exemplary embodiments, the granules 106 are coated with a semi-permeable substantially non-degradable polymer such as phenol formaldehyde, polyurethane, cellulose ester, polyamides, vinyl esters, epoxies, or combinations thereof.

The degradable shell 302 can be or include any material suitable to prevent or eliminate separation or release of the chemical treatment agent(s) 102 from the encapsulated granule 300, 400, 500 until the degradable shell 302 degrades or breaks down. For example, the degradable shell 102 can be impermeable or substantially impermeable to rainwater, hail, sleet, ice, or the like until the degradable shell 302 degrades to a point that it becomes permeable to the surrounding fluid(s). Once the degradable shell 302 becomes fluid permeable, the chemical treatment agent(s) 102 can separate or elute from the encapsulated granule 300, 400, 500.

The degradable shell 302 can be or include any water soluble and/or hydrocarbon soluble material. In one or more exemplary embodiments, the degradable shell 302 can be or include the encapsulation materials and/or sustained release compositions described in any one of U.S. Pre-Grant Publication Nos. 2003/0147821, 2005/0002996 and 2005/0129759, each incorporated by reference herein in its entirety. In one or more exemplary embodiments, the degradable shell 302 can be or include fatty alcohols that include, but are not limited to, behenyl alcohol, caprylic alcohol, cetyl alcohol, cetaryl alcohol, decyl alcohol, lauryl alcohol, isocetyl alcohol, myristyl alcohol, oleyl alcohol, stearyl alcohol, tallow alcohol, steareth-2, ceteth-1, cetearth-3, and laureth-2. The degradable shell 302 can also be or include C8-C20 fatty acids that include, but are not limited to, stearic acid, capric acid, behenic acid, caprylic acid, lauric acid, myristic acid, tallow acid, oleic acid, palmitic acid, and isostearic acid. The degradable shell 302 can also be or include sorbitan derivatives that include, but are not limited to, PEG-IO sorbitan laurate, PEG-20 sorbitan isostearate, PEG-3 sorbitan oleate, polysorbate 40, sorbitan stearate, and sorbitan palmitate. The degradable shell 302 can also be or include one or more waxes that include, but are not limited to, mink wax, montan wax, carnauba wax, and candelilla wax, and synthetic waxes, such as silicone waxes. In one or more exemplary embodiments, the degradable shell 302 can be selected from polyoxymethylene urea (PMU), methoxymethyl methylol melamine (MMM), polysaccharides, collagens, gelatins, alginates, guar, guar gum, gum Arabic, and agar and any combination or mixture thereof. The degradable shell 302 can also be or include any suitable thermoplastic material. In one or more exemplary embodiments, the degradable shell 302 can be selected from olyvinyl alcohol, poly(acrylates and methacrylates), polylactic acid, polyamides, polyethylene, polypropylene, polystyrene, water-soluble polymers, and cross-linkable water-soluble polymers and any combination thereof.

In one or more exemplary embodiments, the degradable shell 302 can be a thermoplastic material that degrades at any suitable time and temperature. For example, the thermoplastic material can degrade at temperatures of at least about 5° C., at least about IO ° C., at least about 20° C., at least about 30° C., at least about 50° C., at least about 70° C., or at least about 90° C. The thermoplastic material can also degrade at temperatures of less than TOO ° C., less than 95° C., less than 90° C., less than 80° C., or less than 70° C. The thermoplastic material can also degrade at temperatures of from about I ° C., about 4° C., about 8° C., about 12° C., about 16° C., about 25° C., about 35° C., about 45° C., or about 55° C. to about 75° C., about 85° C., about 95° C., about 105° C., about 120° C., about 150° C., or about 200° C. or more. In one or more exemplary embodiments, the thermoplastic material can degrade at temperatures of from about 1° C., about 4° C., about 8° C., about 12° C., about 16° C., about 25° C., about 35° C., about 45° C., or about 55° C. to about 75° C., about 85° C., about 95° C., about 105° C., about 120° C., about 150° C., or about 200° C. or more within a time period ranging from about 10 seconds, about 30 seconds, about 1 minute, about 2 minutes, about 5 minutes, about 10 minutes, about 30 minutes, about 1 hour, or about 2 hours to about 5 hours, about 10 hours, about 25 hours, about 50 hours, about 100 hours, about 500 hours, or about 1,000 hours or more.

According to one or more exemplary embodiments, the degradable shell 302 can degrade in any suitable manner. For example, the degradable shell 302 can degrade from the outside-in, such that the outer surface of the degradable shell 302 degrades first, resulting in controlled release of chemical treatment agent 102. The degradable shell 302 can also be a self-polishing coating as disclosed herein.

The degradable shell 302 can prevent the leaching, elution, diffusion, bleeding, discharging, desorption, dissolution, draining, seeping, or leaking of the chemical treatment agent 102 from the non-degraded encapsulated granules, or encapsulated granules 300, 400, 500. According to one or more exemplary embodiments, the chemical treatment agents 106 can leach, elute, diffuse, bleed, discharge, desorb, dissolve, drain, seep, or leak from the encapsulated granules 300, 400, 500 at a rate of less than 10 ppm/(gram*day), less than 5 ppm/(gram*day), less than 2 ppm/(gram*day), less than 1 ppm/(gram*day), less than 0.5 ppm/(gram*day), less than 0.1 ppm/(gram*day), or less than 0.05 ppm/(gram*day) for at least about 1 hour, at least about 2 hours, at least about 6 hours, at least about 12 hours, at least about 1 day, or at least about 2 days of continuous contact with flowing water such as raining water. According to one or more exemplary embodiments, the chemical treatment agent 102 can leach, elute, diffuse, bleed, discharge, desorb, dissolve, drain, seep, or leak from the encapsulated granules 300, 400, 500 at a rate of less than 10 ppm/(gram*day), less than 5 ppm/(gram*day), less than 2 ppm/(gram*day), less than 1 ppm/(gram*day), less than 0.5 ppm/(gram*day), less than 0.1 ppm/(gram*day), or less than 0.05 ppm/(gram*day) for at least about 1 hour, at least about 2 hours, at least about 6 hours, at least about 12 hours, at least about 1 day, or at least about 2 days of continuous contact with raining water. For example, the degradable shell 302 can limit the amount of leaching, elution, diffusion, bleeding, discharging, desorption, dissolution, draining, seeping, or leaking of the chemical treatment agent 102 from the encapsulated granules 300, 400, 500 to less than 10 ppm/gram, less than less than 5 ppm/gram, less than 1 ppm/gram, less than 0.5 ppm/gram, less than 0.1 ppm/gram, or less than less than 10 ppb/gram for about 10 seconds, about 30 seconds, about 1 minute, about 2 minutes, about 5 minutes, about 10 minutes, about 30 minutes, about 1 hour, or about 2 hours to about 5 hours, about 10 hours, about 25 hours, about 50 hours, about 100 hours, about 500 hours, or about 1,000 hours or more of continuous contact with raining water after initial contact with the water. For example, the degradable shell 302 can limit the amount of leaching, elution, diffusion, bleeding, discharging, desorption, dissolution, draining, seeping, or leaking of the chemical treatment agent 102 from the encapsulated granules 300, 400, 500 to less than 10 ppm/gram, less than less than 5 ppm/gram, less than 1 ppm/gram, less than 0.5 ppm/gram, less than 0.1 ppm/gram, or less than less than 10 ppb/gram for about 1 hour, about 10 hours, about 50 hours, about 100 hours, or about 1 month to about 5 hours, about 10 hours, about 25 hours, about 50 hours, about 100 hours, about 500 hours, or about 1,000 hours or more of continuous contact with raining water after initial contact with the water.

In one or more exemplary embodiments, the degradable shell 302 can prevent any leaching, elution, diffusion, bleeding, discharging, desorption, dissolution, draining, seeping, or leaking of the chemical treatment agent 102 from the encapsulated granules 300, 400, 500 prior to or during installation of a roofing system containing the encapsulated granules 300, 400, 500 as disclosed herein. In one or more exemplary embodiments, the degradable shell 302 can prevent any leaching, elution, diffusion, bleeding, discharging, desorption, dissolution, draining, seeping, or leaking of the chemical treatment agent 102 from the encapsulated granules 300, 400, 500 for up to about 1 year, about 3 years, about 5 years or about 10 years after installation of a roofing system containing the encapsulated granules 300, 400, 500 as disclosed herein.

According to several exemplary embodiments, the chemical treatment agent 102 is released from the granules 106 for a period of up to about one year, up to about five years, or up to about ten years after installation of a roofing system containing the encapsulated granules 300, 400, 500 as disclosed herein.

The chemical treatment agents 102 can leach, elute, diffuse, bleed, discharge, desorb, dissolve, drain, seep, or leak from the coated granules 100, 200 at any suitable rate. The chemical treatment agents 102 can also leach, elute, diffuse, bleed, discharge, desorb, dissolve, drain, seep, or leak from the encapsulated granules 300, 400, 500 at any suitable rate once the degradable shell 302 becomes fluid permeable. For example, the chemical treatment agents 102 can leach, elute, diffuse, bleed, discharge, desorb, dissolve, drain, seep, or leak from the coated granules 100, 200 and/or the encapsulated granules 300, 400, 500 at a rate of at least about 0.1 ppm/(gram*day), at least about 0.3 ppm/(gram*day), at least about 0.7 ppm/(gram*day), at least about 1.25 ppm/(gram*day), at least about 2 ppm/(gram*day), at least about 3 ppm/(gram*day), at least about 5 ppm/(gram*day), at least about 10 ppm/(gram*day), at least about 20 ppm/(gram*day), at least about 40 ppm/(gram*day), at least about 75 ppm/(gram*day), or at least about 100 ppm/(gram*day) for at least about 2 weeks, at least about 1 month, at least about 2 months, at least about 6 months, at least about 9 months, at least about 1 year, or at least about 2 years. For example, the chemical treatment agents can elute from the coated granules 100, 200 and/or the encapsulated granules 300, 400, 500 at a rate from about 0.01 ppm/(gram*day), about 0.05 ppm/(gram*day), about 0.1 ppm/(gram*day), about 0.5 ppm/(gram*day), about 1 ppm/(gram*day), about 1.5 ppm/(gram*day), about 2 ppm/(gram*day), or about 3 ppm/(gram*day) to about 4 ppm/(gram*day), about 4.5 ppm/(gram*day), about 5 ppm/(gram*day), about 6 ppm/(gram*day), about 7 ppm/(gram*day), about 8 ppm/(gram*day), about 10 ppm/(gram*day), about 15 ppm/(gram*day), about 30 ppm/(gram*day), about 75 ppm/(gram*day), or about 150 ppm/(gram*day) for at least about 2 weeks, at least about 1 month, at least about 2 months, at least about 6 months, at least about 9 months, at least about 1 year, or at least about 2 years.

The coated granules 100, 200 and/or the encapsulated granules 300, 400, 500 can also be coated and/or infused with a surfactant, such as the hydrophobic and amphiphobic materials disclosed herein. The use of a surfactant that is coated onto and/or infused into the granule itself offers improved wetting characteristics. According to several exemplary embodiments, the surfactants can be released from the coated granules 100, 200 and/or the encapsulated granules 300, 400, 500 when the degradable coating 104 and/or degradable shell 302 dissolves in upon sufficient contact with rainwater. According to such embodiments, upon degradation of the coating 104 and/or shell 302, some of the surfactants are released upon exposure to flowing water, and therefore improve the wettability of roof surfaces. The portion of the surfactants remaining in the granule would improve the wettability of the granule itself.

The surfactant can also leach, elute, diffuse, bleed, discharge, desorb, dissolve, drain, seep, or leak from the coated granules 100, 200 and/or the encapsulated granules 300, 400, 500 at any suitable rate. According to one or more exemplary embodiments, the surfactant can leach, elute, diffuse, bleed, discharge, desorb, dissolve, drain, seep, or leak from the coated granules 100, 200 and/or the encapsulated granules 300, 400, 500 at a rate of at least about 0.1 ppm/(gram*day), at least about 0.3 ppm/(gram*day), at least about 0.7 ppm/(gram*day), at least about 1.25 ppm/(gram*day), at least about 2 ppm/(gram*day), at least about 3 ppm/(gram*day), at least about 5 ppm/(gram*day), at least about 10 ppm/(gram*day), at least about 20 ppm/(gram*day), at least about 40 ppm/(gram*day), at least about 75 ppm/(gram*day), or at least about 100 ppm/(gram*day) for at least about 2 weeks, at least about 1 month, at least about 2 months, at least about 6 months, at least about 9 months, at least about 1 year, or at least about 2 years. For example, the surfactant can elute from the coated granules 100, 200 and/or the encapsulated granules 300, 400, 500 at a rate from about 0.01 ppm/(gram*day), about 0.05 ppm/(gram*day), about 0.1 ppm/(gram*day), about 0.5 ppm/(gram*day), about 1 ppm/(gram*day), about 1.5 ppm/(gram*day), about 2 ppm/(gram*day), or about 3 ppm/(gram*day) to about 4 ppm/(gram*day), about 4.5 ppm/(gram*day), about 5 ppm/(gram*day), about 6 ppm/(gram*day), about 7 ppm/(gram*day), about 8 ppm/(gram*day), about 10 ppm/(gram*day), about 15 ppm/(gram*day), about 30 ppm/(gram*day), about 75 ppm/(gram*day), or about 150 ppm/(gram*day) for at least about 2 weeks, at least about 1 month, at least about 2 months, at least about 6 months, at least about 9 months, at least about 1 year, or at least about 2 years.

As noted above, ceramic granules can be manufactured to a range of apparent specific gravities and such range of specific gravities reflects the range of internal porosity present in the ceramic pellets. The ceramic granules can be manufactured using ceramic proppant manufacturing processes. The internal porosity of commercial ceramic proppant is oftentimes low (generally less than 5% and this internal porosity is not interconnected). As disclosed in U.S. Pat. No. 7,036,591, however, the processing of ceramic proppants can be altered to generate within the individual ceramic pellet a porosity exceeding 30%. As pellet porosity exceeds about 5%, the porosity of the pellet becomes interconnected. According to several exemplary embodiments, the internal interconnected porosity in the porous ceramic proppant can be infused with a chemical treatment agent. Methods for infusing a porous ceramic proppant are well known to those of ordinary skill in the art, for instance see U.S. Pat. Nos. 5,964,291 and 7,598,209, and similar processes such as vacuum infusion, thermal infusion, capillary action, ribbon blending at room or elevated temperature, microwave blending or pug mill processing can be utilized to infuse porous ceramic granules with chemical treatment agents according to several exemplary embodiments of the present disclosure.

While the present disclosure has been described in terms of several exemplary embodiments, those of ordinary skill in the art will recognize that the embodiments can be practiced with modification within the spirit and scope of the appended claims.

The present disclosure has been described relative to several exemplary embodiments. Improvements or modifications that become apparent to persons of ordinary skill in the art only after reading this disclosure are deemed within the spirit and scope of the application. It is understood that several modifications, changes and substitutions are intended in the foregoing disclosure and in some instances, some features of the present disclosure will be employed without a corresponding use of other features. Accordingly, it is appropriate that the appended claims be construed broadly and, in a manner, consistent with the scope of the present disclosure.

What is claimed is:

1. A method of making a self-cleaning cool roof system comprising:
    mixing granule particulates selected from the group consisting of kaolin clays, bauxite clays, alumina and combinations thereof with a reflective material selected from the group consisting of aluminum hydroxide, aluminum oxyhydroxide, alumina trihydrate and combinations thereof to produce granule having a reflectivity of at least about 80%; and
    depositing the granule directly onto a top surface of an asphaltic substrate, wherein the granule adhere to the asphaltic substrate.

2. The method according to claim 1 further comprising sintering the granule particulates before mixing with the reflective material.

3. The method according to claim 1 further comprising sintering the granule particulates after mixing with the reflective material.

4. The method according to claim 1 further comprising separating the granule having a mesh size from about 4 mesh to about 120 mesh to produce a separated granule, wherein the separated granule is deposited onto the top surface of the asphaltic substrate.

5. The method according to claim 1 further comprising mixing additional granule particulates selected from the group consisting of natural sand, ceramic granule particulates, silica or a combination thereof to produce the granule.

6. The method according to claim 1 further comprising chemically treating the granule with a chemical treatment agent to produce a treated granule, wherein the treated granule is deposited onto the top surface of the asphaltic surface.

7. The method according to claim 6, wherein chemically treating the granule comprises coating the granule with the chemical treatment agent.

8. The method according to claim 7, wherein the chemical treatment agent comprises a degradable coating which degrades upon contact with water.

9. The method according to claim 6, further comprising encapsulating at least a portion of the treated granule in a degradable shell.

10. The method according to claim 9, wherein the degradable shell is selected from the group consisting of polyvinyl alcohol, poly(acrylates and methacrylates), polylactic acid, polyamides, polyethylene, polypropylene, polystyrene, water-soluble polymers, and cross-linkable water-soluble polymers and any combination thereof.

11. The method according to claim 9, wherein the degradable shell comprises a thermoplastic material that degrades at temperatures of from about 25° C. to about 200° C. within a time period ranging from about 10 minutes to about 1,000 hours.

12. The method according to claim 6, wherein chemically treating the granule comprises infusing the granule with the chemical treatment agent.

13. The method according to claim 6, wherein the chemical treatment agent comprises corrosion inhibitors, organic deposition inhibitors, biocides, algaecides, fungicides, enzymes, or biological agents or combinations thereof.

14. The method according to claim 6 wherein the chemical treatment agent comprises a hydrophobic material, an oleophobic material, or an amphiphobic material.

15. The method according to claim 1 further comprising providing the asphaltic substrate having a plurality of layers include at least one layer of bitumen material and at least one layer of reinforcing material.

16. A method of making a self-cleaning cool roof system comprising:
    mixing granule particulates comprising sintered kaolin with a reflective material comprising alumina trihydrate to produce granule having a reflectivity of at least about 80%; and depositing the granule directly onto a top surface of an asphaltic substrate, wherein the granule adhere to the asphaltic substrate.

17. The method according to claim 16 mixing additional granule particulates selected from the group consisting of bauxite clays, alumina, natural sand, ceramic granule particulates, silica or combination thereof to produce the granule.

18. The method according to claim 16 further comprising chemically treating the granule with a chemical treatment agent to produce a treated granule, wherein the treated granule is deposited onto the top surface of the asphaltic surface.

19. The method according to claim 18, further comprising encapsulating at least a portion of the treated granule in a degradable shell.

20. The method according to claim 16 further comprising separating the granule having a mesh size from about 4 mesh to about 120 mesh to produce a separated granule, wherein the separated granule is deposited onto the top surface of the asphaltic substrate.

21. A method of making a self-cleaning cool roof system comprising:
mixing granule particulates selected from the group consisting of kaolin clays, bauxite clays, alumina and combinations thereof with a reflective material selected from the group consisting of alumina, titanium dioxide, zinc oxide, aluminum hydroxide, aluminum oxyhydroxide, alumina trihydrate and combinations thereof and additional granule particulates selected from the group consisting of natural sand, ceramic granule particulates, or a combination thereof to produce granule having a reflectivity of at least about 80%; and
depositing the granule directly onto a top surface of an asphaltic substrate, wherein the granule adhere to the asphaltic substrate.

22. A method of making a self-cleaning cool roof system comprising:
mixing granule particulates selected from the group consisting of kaolin clays, bauxite clays, alumina and combinations thereof with a reflective material selected from the group consisting of alumina, titanium dioxide, zinc oxide, aluminum hydroxide, aluminum oxyhydroxide, alumina trihydrate and combinations to produce granule having a reflectivity of at least about 80%;
chemically treating the granule with a chemical treatment agent to produce a treated granule;
encapsulating at least a portion of the treated granule in a degradable shell, wherein the degradable shell is selected from the group consisting of polyvinyl alcohol, poly(acrylates and methacrylates), polylactic acid, polyamides, polyethylene, polypropylene, polystyrene, water-soluble polymers, and cross-linkable water-soluble polymers and any combination thereof; and
depositing the encapsulated granule directly onto a top surface of an asphaltic substrate, wherein the encapsulated granule adhere to the asphaltic substrate.

* * * * *